United States Patent
Celi, Jr. et al.

(10) Patent No.: US 9,451,454 B2
(45) Date of Patent: Sep. 20, 2016

(54) MOBILE DEVICE IDENTIFICATION FOR SECURE DEVICE ACCESS

(75) Inventors: Joseph Celi, Jr., Boca Raton, FL (US); Olgierd S. Pieczul, Dublin (IE); Mary Ellen Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 13/344,156

(22) Filed: Jan. 5, 2012

(65) Prior Publication Data

US 2013/0178190 A1 Jul. 11, 2013

(51) Int. Cl.
*H04M 1/66* (2006.01)
*H04M 1/68* (2006.01)
*H04W 4/00* (2009.01)
*H04W 12/06* (2009.01)
*H04W 4/12* (2009.01)

(52) U.S. Cl.
CPC ............... *H04W 12/06* (2013.01); *H04W 4/12* (2013.01)

(58) Field of Classification Search
USPC ................................ 455/411, 435.1; 726/5, 6
See application file for complete search history.

(56) References Cited

U.S. PATENT DOCUMENTS

| 7,707,120 B2 | 4/2010 | Dominguez et al. |
| 7,945,959 B2 | 5/2011 | Ilechko |
| 2008/0148057 A1 | 6/2008 | Hauw |
| 2008/0318670 A1* | 12/2008 | Zinder ............... G07F 17/3223 463/25 |
| 2011/0099612 A1* | 4/2011 | Lee ........................ H04L 51/04 726/6 |
| 2012/0028609 A1* | 2/2012 | Hruska ............. G06Q 20/3674 455/411 |

FOREIGN PATENT DOCUMENTS

WO 2011055002 A1 5/2011

OTHER PUBLICATIONS

"Method to access securely access web site from mobile phone", IBM Corporation, ip.com Prior Art Database Technical Disclosure, Jul. 1, 2002, 5 pages.
Biswas, "Securing the Linux-Java Platform for Mobile Phones Using Mandatory Access Controls", Motorola Software Technical Journal, ip.com Prior Art Database Technical Disclosure, Mar. 1, 2007, 11 pages.

* cited by examiner

*Primary Examiner* — Joshua Schwartz
(74) *Attorney, Agent, or Firm* — Yee & Associates, P.C.; David Woycechowski (57) ABSTRACT

An embodiment of the invention includes initially registering information with a data system, wherein the registered information pertains to a user of a mobile device and includes credential information, and further includes a message address associated with the user. An enrollment request, together with the specified credential information, is sent to a management server. Responsive thereto, the server sends a message of specified type to the message address associated with the user, wherein such message includes a pin code. The pin code is then sent from the device to the server, and responsive to receiving the pin code, the server is operated to deliver a security token, for use in authenticating the mobile device to selectively access the particular data processing system.

20 Claims, 5 Drawing Sheets

MOBILE DEVICE IDENTIFICATION FOR SECURE DEVICE ACCESS

BACKGROUND

1. Field of Invention

The invention disclosed and claimed herein pertains to a method and apparatus for improving or enhancing identification of a mobile device, which is used to request access to a secure data processing system or a component thereof.

2. Description of the Related Art

In order to prevent a hacker or other unauthorized user from obtaining access to a data processing system, a currently used arrangement employs an IP address range restrictions technique. In this technique, an administrator sets up a list of trusted IP addresses that are allowed to access the system. Each of the listed addresses is included in the intranet of the enterprise or other organization that controls the data processing system. If a hacker attempts to impersonate a trusted user by means of a system that is outside of the organization intranet, the attempted access will be denied.

While the above technique of IP address range restrictions has worked for computers that are part of a corporate or other organization intranet, this technique is generally not usable for mobile devices that seek to access systems associated with such intranets. This is because the IP address of a mobile device, also known as a handheld computer, can be continually and unpredictably changed by its service provider. However, as is well known by those of skill in the art, the number of mobile devices in use is growing very rapidly. Such devices, merely by way of example, include personal digital assistants (PDAs), smartphones, and iPads™. It would therefore be useful to provide an approach for more readily recognizing or identifying mobile devices that are authorized to access a particular secure system.

SUMMARY

Embodiments of the invention include a method, a computer program product, and apparatus for identifying a mobile device to a particular data processing system that has a mobile device management (MDM) server. An embodiment directed to a method includes the step of initially registering information with the particular data system that pertains to a user of the mobile device, wherein the registered information includes specified credential information and further includes a unique message address associated with the user. The method further includes receiving an enrollment request message at the MDM server, wherein the enrollment request message includes the specified credential information. Responsive to receiving the enrollment request message, the MDM server is operated to send a message of specified type to the unique message address associated with the user, wherein the message of specified type includes a personal identification number (pin) code. Subsequent to receiving the message of specified type, a second message is received at the MDM server that includes the pin code. Responsive to receiving the pin code, the MDM server is operated to deliver a security token, for use in authenticating the mobile device to selectively access the particular data processing system.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
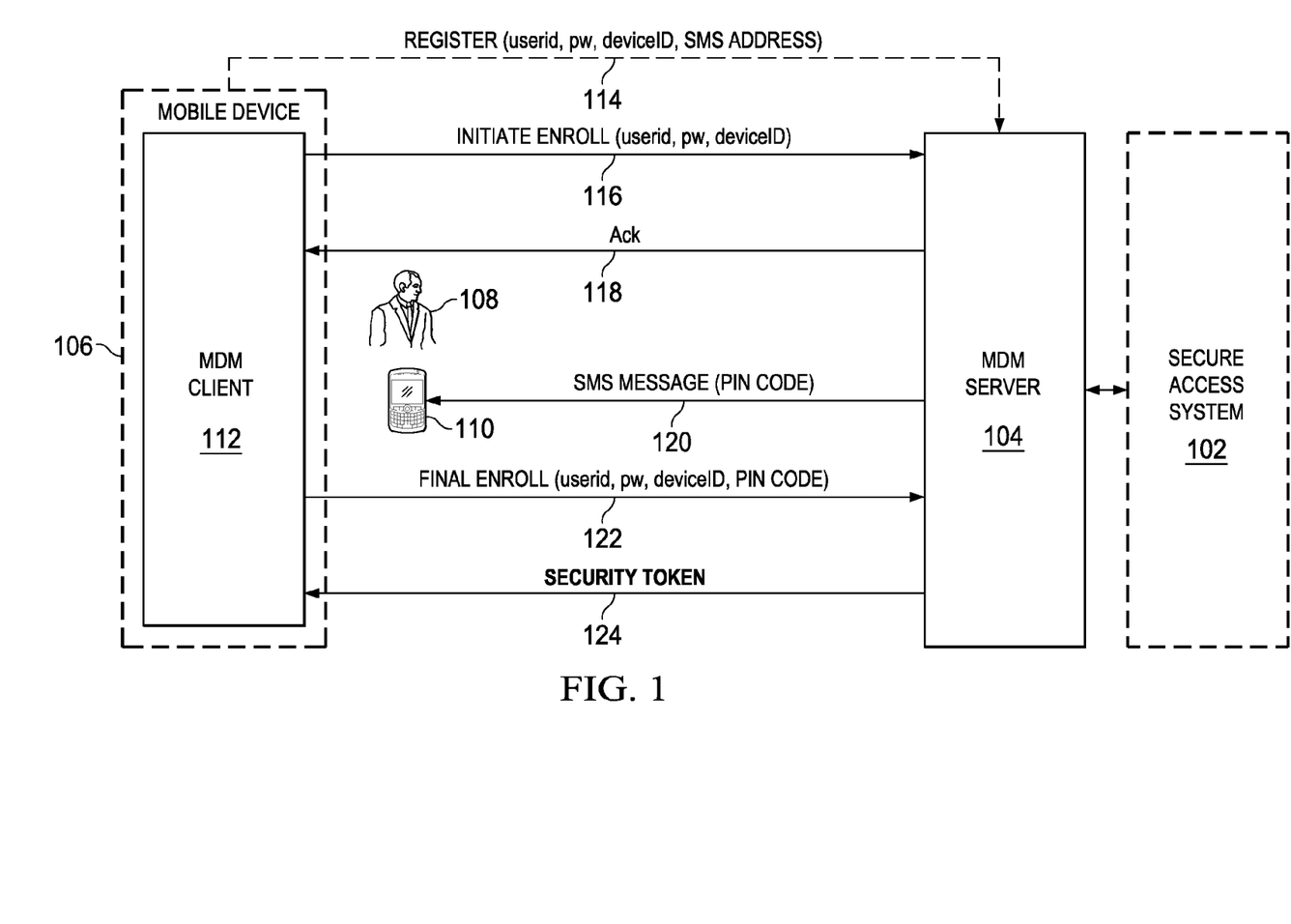
FIG. 1 is a schematic diagram showing respective components for an embodiment of the invention.

Referring to FIG. 1, there is shown a secure access system 102 of a particular type, wherein users of mobile devices such as those referred to above are disposed to seek access to the system or to components thereof. However, secure access system 102 is a secure access system in that before any request from a mobile device to access the system is granted, it must be demonstrated that access by such mobile device has been authorized. In order to handle access requests from different mobile devices, secure access system 102 is provided with a Mobile Device Manager (MDM) server 104.

FIG. 1 further shows a mobile device 106 of a presently available type, which is in the possession of, or otherwise under the complete control of, a user 108. Mobile device 106 comprises a computer device that can run programs, selectively process computer data, and exchange computer data with system networks, websites, and the like. Mobile device 106 is also capable of accessing secure access system 102, if such access can be authorized. However, for the embodiment of FIG. 1, it is to be emphasized that mobile device 106 has a very significant limitation, which is exemplified by mobile devices such as the iPad™

More particularly, while the iPad™ is a computer device, and can run operating systems and connect to various system networks over the Internet or other computer related paths, the iPad™ does not have mobile phone capability. Thus, the iPad™ and devices similar thereto cannot send calls into and receive calls from a public switched telephone system over a radio link. In like manner, mobile device 106 also does not have mobile phone capability and thus is not able to exchange calls with a public switched telephone system over a radio link. As a further similarity with devices such as the iPad™, mobile device 106 is not able to receive text messages, such as short message service (SMS) messages, from a public switched telephone system over a radio link.

In view of the above deficiency in regard to mobile device 106, the embodiment of FIG. 1 shows a mobile phone 110, which is in the possession of, or otherwise under the complete control, of user 108, in like manner with the way that mobile device 106 is controlled. Mobile phone 110 comprises a conventional mobile phone or cell phone, which has a unique mobile phone number and is able to send calls into and receive calls from a public switched telephone system over a radio link. Mobile phone 110 is also able to receive text messages such as SMS messages from a public switched telephone system over a radio link, wherein the SMS messages are specifically directed to the phone number of mobile phone 110.

Referring further to FIG. 1, it is anticipated that user 108 will use mobile device 106 to request access to secure access system 102 or to a component thereof. It is anticipated further that mobile device 106 will need to be identified as a secure accessing device by secure access system 102, in accordance with an embodiment of the invention.

As an initial or preliminary step 114 for such identification, user 108 must create an account with secure access system 102 and register mobile device 106 with MDM server 104. As shown by FIG. 1, the registration procedure includes operating mobile device 106 to furnish MDM server 104 with certain credential information pertaining to user 108 and mobile device 106. Credential information as used herein includes one or more information items that each pertain and are unique to user 108. This information includes a user identification (userid), a password (pw), and a device identification number (deviceID). The userid and password uniquely identify user 108, and the deviceID is a conventional device identification of mobile device 106.

However, embodiments of the invention are not limited thereto. For example, in other embodiments credential information could include a certificate from a certificate provider that identified user 108 as a valid user of system 102. The credential information could also include the identity of the certificate provider. In yet another example, user 102 could have previously been logged into system 102, and the credential information would include a credential created by MDM server 104 based on a password used by user 102, or could include a public key mechanism.

In the embodiment of FIG. 1, mobile device 106 also provides MDM server 104 with an SMS address, which comprises or includes the mobile phone number of mobile phone 110. The device identifier or identification number may be, for example, without limitation, an International Mobile Equipment Identity (IMEI), a media access code (MAC) address, a processor identifier, a model and serial number, a device fingerprint, or some other suitable type of device identifier. An IMEI number is assigned to the device by the device manufacturer and burned into the mobile device's ROM. A media access control address is a unique identifier assigned to network interfaces. A processor identifier is a unique identifier assigned to a processor unit. The model and serial number may be identification information for the particular device. A device fingerprint is information about software, hardware, or a combination of the two on a device. This information may be a summary of settings for hardware, software, or a combination of the two. In other cases, the device fingerprint may also include an identification of software, hardware, or a combination of the two present on a device.

FIG. 1 further shows an MDM client 112 contained or located within mobile device 106. In a useful embodiment, MDM client 112 comprises an account management software application or the like, which is installed or loaded into mobile device 106 by MDM server 104 of secure access system 102, as part of the registration procedure of step 114.

When user 108 seeks to use mobile device 106 to access secure access system 102, at some time after completing the registration procedure, an enrollment procedure must be carried out, to enable mobile device 106 to be granted such access. The enrollment procedure, also referred to herein as "enrollment", is depicted in FIG. 1 by steps 116-124. At step 116, MDM client 112 is run to initiate the enrollment procedure by sending an enrollment request message to MDM server 104. The enrollment request message includes the credential information registered in connection with mobile device 106, that is, the userid, password, and deviceID.

In response to receiving the enrollment request message, MDM server 104 returns an acknowledgment to MDM client 112, as shown by step 118. In addition, MDM server 104 performs an analysis of the received credential information to determine its validity. If the credential information is found to include a properly registered userid, password, and deviceID for the user 108 and mobile device 106, MDM server 104 is operated to query at least one specified database (not shown) in regard to mobile phone 110. More particularly, MDM server 104 queries such database to determine whether user 108 has reported mobile phone 110 as being lost or stolen. For example, user 108 could understand that if mobile phone 110 was ever lost or stolen, he needed to contact the administrator of secure access system 102 immediately to report such event. The administrator would maintain a database for this information, which would be the specified database queried by MDM server 104. Alternatively, the service provider of mobile phone 110 could be queried to determine if the phone had been reported as lost or stolen.

If the response to the query is positive, indicating mobile phone 110 was lost or stolen, the access request sent from mobile device 106 is denied. However, if the response to the query is negative, it is reasonably assumed that mobile phone 110 is then still under the control of user 108. Accordingly, a message comprising an SMS message is sent to the SMS address at step 120, wherein the SMS address comprises the phone number of mobile phone 110 as described above. Accordingly, the SMS message is delivered to mobile phone 110. The SMS message contains a unique personal identification number (pin) code and in addition may include instructions to user 108 to key the pin code into the text field of MDM client 112. A pin code, as such term is used herein, is a secret alphanumeric password shared between a user and a system wherein the password can be used to authenticate the user to the system. More particularly, a pin code is a sequence of alphanumeric characters that is known only to the user and to the system that provides the code, and that uniquely identifies the user to the system so that the user can be granted access to the system.

At step 122, after keying in or entering the pin code as directed, MDM client 112 is operated to send a second client message to MDM server 104, as a further step of the overall enrollment. The second message includes both the credential information and the unique pin code sent to mobile phone 110. MDM server 104 determines from the credential information that the second message has been sent from a mobile device associated with registered user 108. Moreover, MDM server 104 confirms that the unique pin code is the very same pin code that was previously sent to the mobile phone 110 of registered user 108. Since MDM server 104 knows that mobile phone 110 was not reported as lost or stolen at the time the pin code message was sent to the mobile phone number of mobile phone 110, mobile phone 110 must have been under the control of user 108 at such time. Accordingly, the pin code must have been delivered to user 108 via mobile phone 110. It follows that the second message could only come from a mobile device that was likewise under the control of registered user 108, since there was no other way for someone to gain access to the unique pin code. The mobile device 106 of registered user 108 is thereby identified as a trusted device, which may be granted access to secure access system 102.

In view of the above conclusions, MDM server 104 sends a security token to MDM client 112 at step 124. This action successfully concludes the enrollment. The security token may comprise a specific table entry, a data address, or other specified information, which may be used subsequently by MDM client 112 to enable mobile device 106 to access secure access system 102. The security token will be the only element needed to authenticate access requests sent from mobile device 106.

To summarize the enrollment illustrated by steps 116-124 of FIG. 1, such enrollment is initiated or commenced when an enrollment request message is sent from MDM client 112 to MDM server 104, at step 116. Successive messages are then sent between MDM server 104, and MDM client 112 and mobile phone 110, in accordance with steps 118-122. Finally, a security token is sent from MDM server 104 to MDM client 112, to conclude the enrollment. MDM client 112 may then access secure access system 102, such as to access a specified service, or for some other purpose.

In a useful embodiment of the invention, the security token will have a time threshold, so that it will expire at a specified time after being sent to MDM client 112. Following expiration, the enrollment procedure of steps 116-124 will need to be repeated, in order to obtain another security token for use by mobile device 106. The time threshold, or timeout period, could be on the order of minutes, hours or days, depending on the specific application or circumstance. If the timeout period was comparatively short, such as on the order of minutes, and a user of MDM client 112 needed to access and reaccess system 102 frequently, such as at hourly intervals, it could be necessary to repeatedly perform the enrollment defined by steps 116-124.

As an additional feature, secure access system 102 could maintain a list of trusted IP addresses that would each be granted access to the system. The list, for example, could include the IP address of each user device that was connected to an intranet associated with the system. Then, when MDM server 104 receives an access request from MDM client 112, MDM server 104 would initially determine whether mobile device 106 has provided an IP address that is included in the list. If not, MDM server 104 determines whether MDM client 112 of mobile device 106 has provided an acceptable security token, as described above.

Figure 2:
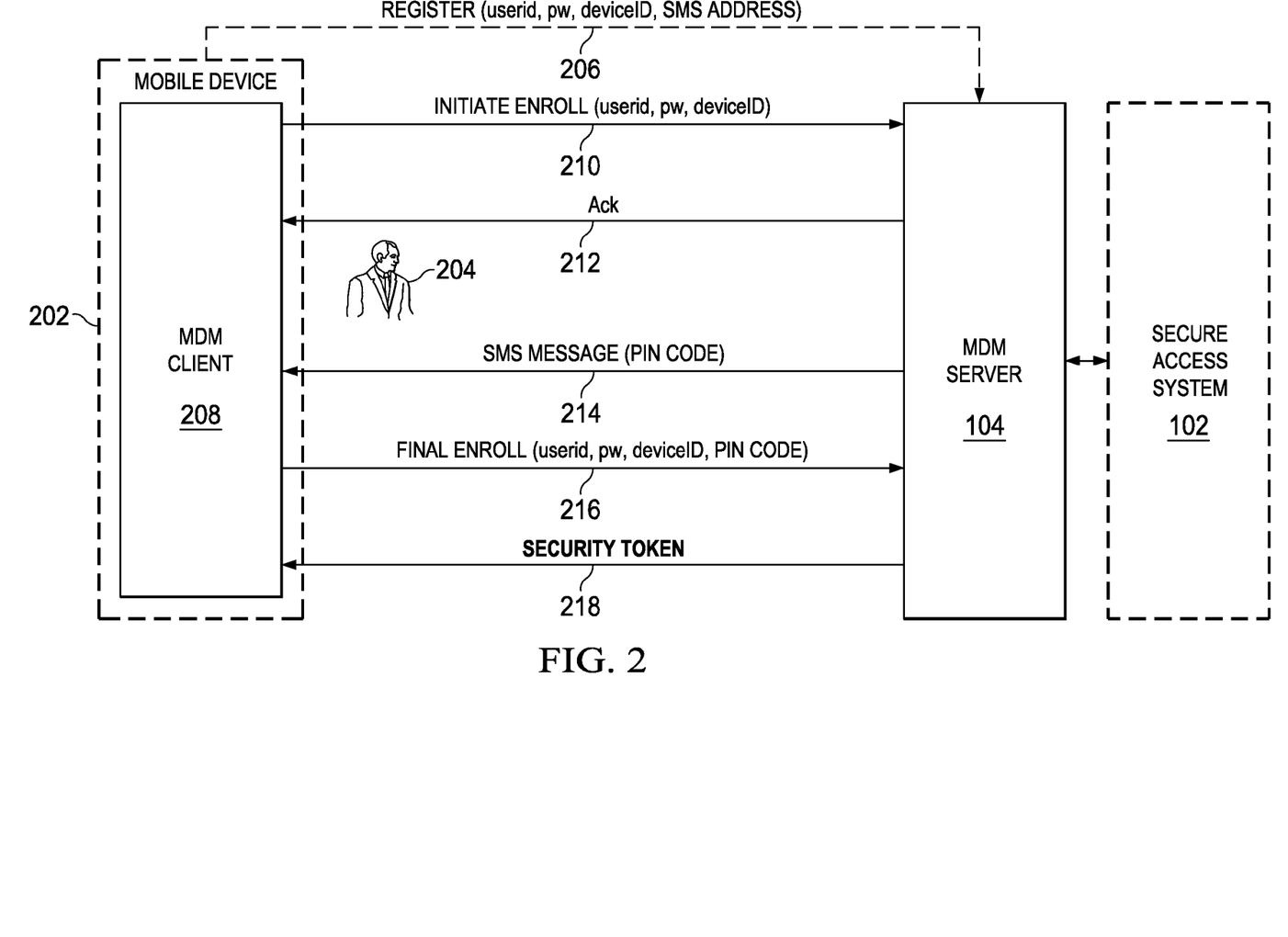
FIG. 2 is a schematic diagram showing respective components for a second embodiment of the invention.

Referring to FIG. 2, there is shown secure access system 102 and MDM server 104 described above, together with a mobile device 202. Mobile device 202 is possessed by, or otherwise under the control of, a user 204. Mobile device 202 comprises a device such as a smartphone, which is known by those of skill in the art to combine the functions of a mobile phone with the functions of a handheld computer, such as a PDA. Mobile device 202 is thus quite different from mobile device 106 of FIG. 1 in significant respects.

Mobile device 202 is exemplified by devices such as an iPhone™ but is not limited thereto. An integral portion or component of mobile device 202 comprises a mobile phone so that mobile device 202 is able to exchange calls with a public switched telephone system over a radio link. The mobile phone number of mobile device 202 is the phone number of its mobile phone component. Mobile device 202 is also capable of receiving text messages such as SMS messages, when such messages are directed to the mobile phone number of mobile device 202.

If user 204 wants to use mobile device 202 to request access to secure access system 102, mobile device 202 must first be identified as an authorized or secure device in like manner with mobile device 106 of FIG. 1. In order to achieve this authorization in accordance with an embodiment of the invention, mobile device 202 is initially registered with MDM server 104, as shown by step 206. This step is similar to step 114 of FIG. 1 in that mobile device 202 is operated to furnish MDM server 104 with both credential information and an SMS address. The credential information for step 206 includes a userid and password that identifies user 204 and a deviceID that identifies mobile device 202. However, the SMS address for step 206 comprises the unique mobile phone number of mobile device 202, and not the phone number of a different mobile phone device which is separate from mobile device 202, as was described for the embodiment of FIG. 1.

Usefully, the registration procedure for mobile device 202 includes loading an MDM client 208 into mobile device 202, wherein the MDM client 208 comprises an account management software application.

Referring further to FIG. 2, there is shown an enrollment procedure comprising steps 210-218. To initiate the enrollment procedure, MDM client 208 is run to send an enrollment request message to MDM server 104, together with the credential information for mobile device 202 at step 210. In response, MDM server 104 returns an acknowledgment to MDM client 208 at step 212. MDM server 104 then analyzes the credential information to determine its validity. Upon recognizing that the credential information is valid for user 204 and mobile device 202, MDM server 104 queries at least one specified database (not shown) to determine if user 204 has reported mobile device 202 as being lost or stolen.

If the response to such query is positive, the access request sent from mobile device 202 is denied. However, if the response is negative, MDM server 104 sends an SMS message to the SMS address, which comprises the mobile phone number of mobile device 202. As shown by step 214, the SMS message contains a pin code, which is a unique personal identification code. Thus, the SMS message with the unique pin code will be delivered to MDM client 208 of mobile device 202.

Upon receipt of the pin code, user 204 could manually key the pin code into the text field of MDM client 208 in preparation for sending a second client message to MDM server 104 at step 216. However, in a useful embodiment, MDM client 208 is configured to automatically launch the second client message at step 216 in response to receiving the pin code from MDM server 104. As described above in connection with FIG. 1, the second client message includes both the credential information and the unique pin code. From these elements, MDM server 104 can conclude that mobile device 202 and user 204 may be granted access to secure access system 102. Upon reaching this conclusion, MDM server 104 sends a security token to MDM client 208 at step 218 for use in authenticating subsequent access requests.

It will be seen that in the embodiment of FIG. 2, no user involvement is required for the enrollment procedure by user 204, following initiation of the enrollment at step 210 until the security token is received by mobile device 202 at step 218. Instead, MDM client 208 and MDM server 104 can carry out the enrollment procedure automatically. As with the security token of FIG. 1, the security token sent to mobile device 202 may have a specified time out or expiration period.

Figure 3:
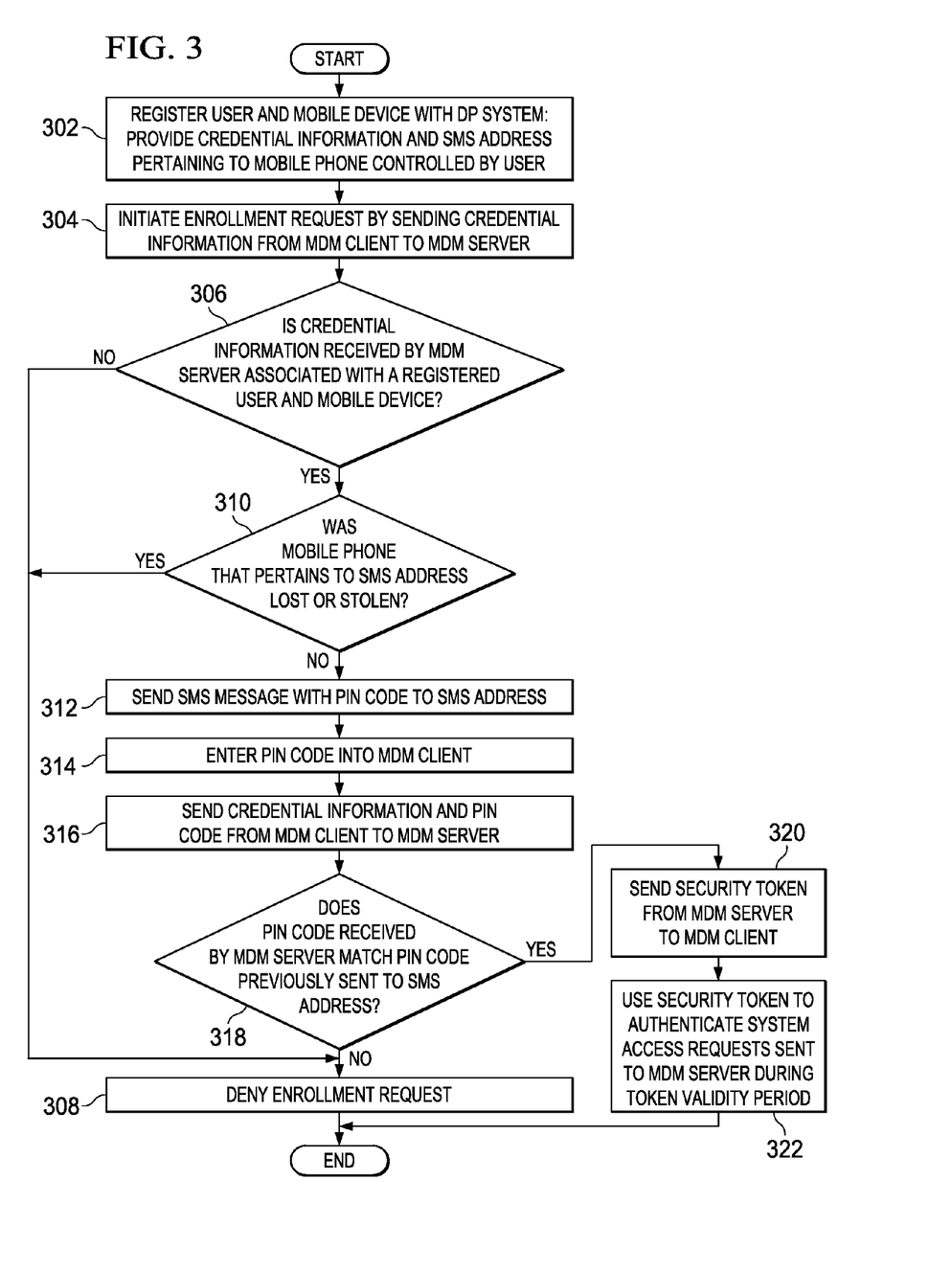
FIG. 3 is a flowchart showing steps for a method comprising an embodiment of the invention.

Referring to FIG. 3, there is shown a flowchart depicting principal steps for a method comprising an embodiment of the invention, such as the embodiment described above in connection with FIG. 1. At step 302, a mobile device and mobile device user that seeks to access a data processing system are registered with the system. The system is provided with credential information that identifies the user and the mobile device, as described above, and is further provided with a phone number of a mobile phone that is under the control of the user. The mobile phone number is used for the SMS address, and the mobile phone is a separate and distinct device from the mobile device. An MDM client may also be loaded into the mobile device during registration step 302.

At some time after registration, an enrollment is initiated by sending an enrollment request message with the credential information from the MDM client to an MDM server of the system, as indicated by step 304. At decision step 306, the MDM server determines whether the received credential information pertains to a properly registered user and mobile device. If not, the enrollment request is denied, as shown by step 308, and the method of FIG. 3 ends. Otherwise, the method proceeds to decision step 310.

At step 310, it must be determined whether the mobile phone that uses the phone number comprising the SMS address was lost or stolen. This may be done by querying a specified database, as described above. If the mobile phone was lost or stolen, the enrollment request is denied. Otherwise, the method proceeds to step 312.

At step 312, an SMS message with a unique pin code contained therein is sent by the MDM server to the SMS address, and thus to the mobile phone which is under the control of the user. For the embodiment of FIG. 1, the user manually keys the pin code into the text field of the MDM client at step 314. The pin code is then sent from the MDM client with the credential information to the MDM server at step 316.

For the embodiment of FIG. 2, where the mobile phone is included as an integral component of the mobile device, the MDM client would receive the pin code directly from the MDM server. In response, software included in the MDM client could automatically carry out steps 314 and 316.

At decision step 318, the MDM server decides whether or not the pin code received from the MDM client exactly matches or is identical to the pin code sent at step 312. If so, the method proceeds to step 320, and otherwise the enrollment request is denied.

At step 320, a security token is sent from the MDM server to the MDM client, to successfully complete the enrollment. At step 322, the token is used to authenticate system access requests sent to MDM server during the token validity period.

Figure 4:
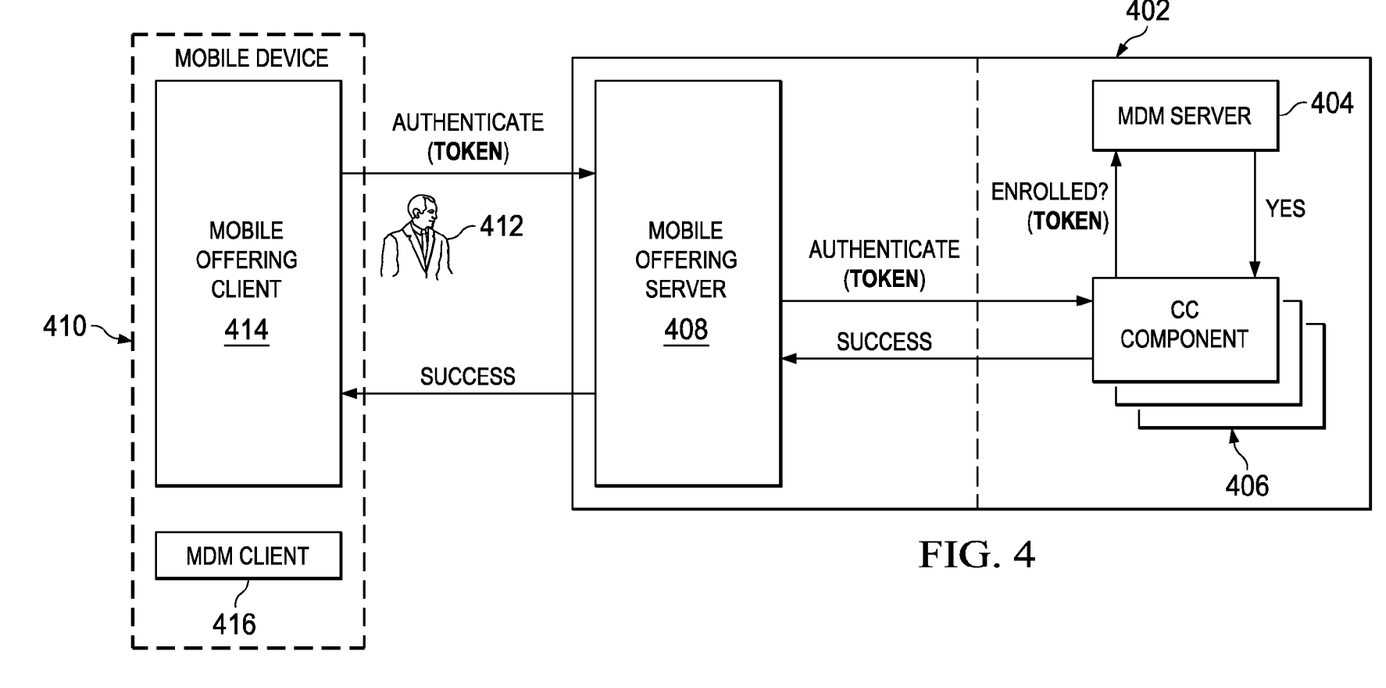
FIG. 4 is a block diagram showing an embodiment of the invention in use to authenticate a request to access a particular secure system.

Referring to FIG. 4, there is shown a data processing system 402, which is one type of a secure access system 102 described in connection with FIGS. 1 and 2. Data processing system 402 thus has an MDM server 404, which may be similar or identical to MDM server 104 of secure access system 102. Moreover, data processing system 402 is configured to provide offerings that include cloud computing components 406, wherein users may seek to access different components 406 by means of mobile devices. Accordingly, data processing system 402 has a mobile offering (MO) server 408, which handles respective access requests that are directed to data processing system 402 from different mobile devices.

FIG. 4 further shows a mobile device 410, which is to be used by a user 412 to request access to a particular component 406 of data processing system 402. Mobile device 410 is thus provided with an application comprising a mobile offering (MO) client 414, which is disposed to communicate and interact with MO server 408. Mobile device 410 may be similar or identical to mobile device 106 of FIG. 1 or to mobile device 202 of FIG. 2. Mobile device 410 further includes an MDM client 416, which may be similar or identical to MDM client 112 or MDM client 208, respectively.

In regard to FIG. 4, it is assumed that user 412 previously recognized that it would be necessary to authenticate a request to access components of data processing system 402. Accordingly, user 412 has already acquired a security token for this purpose which is currently valid by means of the enrollment procedure described above in connection with FIG. 1 and FIG. 2.

Referring further to FIG. 4, there is shown the token sent from MO client 414 of mobile device 410 to MO server 408, together with a request to access a specified component 406 of data processing system 402. The request and token are then sent to the specified component 406 for authentication. In response, the specified component 406 routes the token to MDM server 404 to determine whether the token is a valid enrolled token. Upon MDM server 404 making a positive determination, and thus recognizing that user 412 and mobile device 410 can be trusted for access, a message approving access is sent to the component 406. The approval message is then routed through MO server 408 to MO client 414 of mobile device 410.

Figure 5:
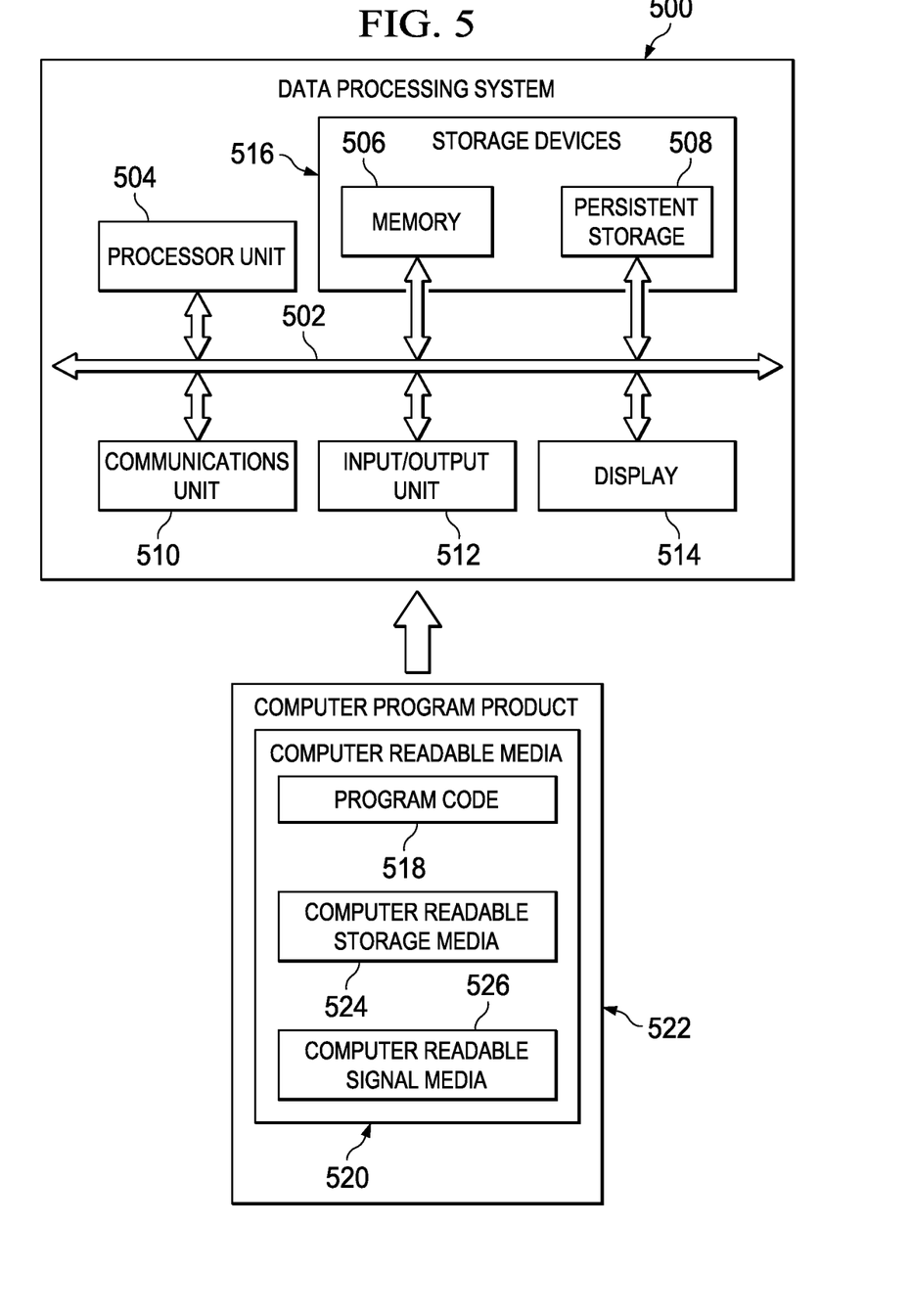
FIG. 5 is a block diagram showing a data processing system that may be used as one or more of the components of the embodiment of FIG. 1 or FIG. 2.

FIG. 5 depicts a diagram of a data processing system in accordance with an illustrative embodiment. Data processing system 500 is an example of a computer, which may be used to implement respective components of embodiments of the invention, and in which computer usable program code or instructions implementing the processes may be located for the illustrative embodiments. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems, in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Memory 506, in these examples, may be, for example, a random access memory, or any other suitable volatile or non-volatile storage device. Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 may be removable. For example, a removable hard drive may be used for persistent storage 508.

Communications unit 510, in these examples, provides for communication with other data processing systems or devices. In these examples, communications unit 510 is a network interface card. Communications unit 510 may provide communications through the use of either or both physical and wireless communications links.

Input/output unit 512 allows for the input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code, in the different embodiments, may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522. In one example, computer readable media 520 may be computer readable storage media 524 or computer readable signal media 526. Computer readable storage media 524 may include, for example, an optical or magnetic disc that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory that is connected to data processing system 500. In some instances, computer readable storage media 524 may not be removable from data processing system 500.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 518 may be downloaded over a network to persistent storage 508 from another device or data processing system through computer readable signal media 526 for use within data processing system 500. For instance, program code stored in a computer readable storage media in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide physical or architectural limitations to the manner in which different embodiments may be implemented. The different illustrative embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of executing program code. As one example, data processing system 500 may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying a mobile device to a particular data processing system that has a mobile device management (MDM) server, said method comprising steps of:

initially registering information with the particular data processing system that pertains to a user of the mobile device, wherein the registered information includes specified credential information and further includes a unique message address associated with said user;

receiving an enrollment request message at the MDM server, wherein the enrollment request message includes said specified credential information;

responsive to receiving the enrollment request message, operating the MDM server to send a message of specified type to the unique message address associated with said user, wherein said message of specified type includes a personal identification number (pin) code;

subsequent to sending the message of specified type, receiving a second message at the MDM server that includes the pin code; and responsive to receiving the pin code, operating the MDM server to deliver a security token for use in authenticating the mobile device to selectively access the particular data processing system.

2. The method of claim 1, wherein:
said message of specified type comprises a message in the form of a short message service (SMS) message.

3. The method of claim 1, wherein:
following delivery of the security token, the security token is sent from the mobile device to the particular data processing system, together with a given request to allow the mobile device to selectively access the particular data processing system, wherein the security token is used to authenticate the given request.

4. The method of claim 1, wherein:
said specified credential information includes a user identification and password that uniquely identify said user, and a device identification that uniquely identifies the mobile device.

5. The method of claim 1, wherein:
the particular data processing system has a list of valid IP addresses associated with a system intranet, and responsive to receiving an access request from the mobile device, the MDM server is operable to initially determine whether the mobile device has provided an IP address that is included in the list of valid IP addresses, and if not, the MDM server is further operable to determine whether the mobile device has provided one of said security tokens.

6. The method of claim 1, wherein:
an integral portion of the mobile device comprises a first mobile phone that has a first mobile phone number, wherein the first mobile phone is able to receive said message of specified type, and the first mobile phone number comprises at least a portion of said unique message address.

7. The method of claim 6, wherein:
in response to receiving the enrollment request, and prior to sending said message of specified type to a message address that includes the first mobile phone number, querying at least one specified database to determine whether or not the mobile device is then under the control of said user, and if not, denying the enrollment request.

8. The method of claim 1, wherein:
a second mobile phone that is a separate device from said mobile device is under the control of said user at said specified time of initial registration, wherein the second mobile phone is able to receive said message of specified type, and has a second mobile phone number that comprises at least a portion of said unique message address.

9. The method of claim 8, wherein:
in response to receiving the enrollment request, and prior to sending said message of specified type to a message address that includes the second mobile phone number, querying at least one specified database to determine whether or not the second mobile phone is then under the control of said user, and if not, denying the enrollment request.

10. The method of claim 1, wherein:
the enrollment request message and the second message that includes the pin code are each sent to the MDM server by a mobile device management (MDM) client located at the mobile device, and the security token is delivered to the MDM client.

11. The method of claim 10, wherein:
the security token becomes invalid at a predetermined time following delivery of the security token to the MDM client.

12. The method of claim 10, wherein:
the MDM client is loaded into the mobile device by the MDM server during said initial registration.

13. The method of claim 10, wherein:
the MDM client receives the message of specified type and the pin code directly from the MDM server, and responsive to receiving the pin code, the MDM client automatically sends the pin code together with the specified credential information to the MDM server without user intervention.

14. A computer program product comprising a computer recordable storage device and program instructions stored thereon that are operable, when executed by a data processor, for identifying a mobile device to a particular data processing system that has a mobile device management (MDM) server, said computer program product comprising:
instructions for initially registering information with the particular data processing system that pertains to a user of the mobile device, wherein the registered information includes specified credential information and further includes a unique message address associated with said user;
instructions for receiving an enrollment request message at the MDM server, wherein the enrollment request message includes said specified credential information;
instructions responsive to receiving the enrollment request message for operating the MDM server to send a message of specified type to the unique message address associated with said user, wherein said message of specified type includes a personal identification number (pin) code;
instructions for receiving a second message at the MDM server that includes the pin code, subsequent to sending the message of specified type; and
instructions responsive to receiving the pin code for operating the MDM server to deliver a security token for use in authenticating the mobile device to selectively access the particular data processing system.

15. The computer program product of claim 14, wherein:
the enrollment request message and the second message that includes the pin code are each sent to the MDM server by a mobile device management (MDM) client located at the mobile device.

16. The computer program product of claim 14, wherein:
an integral portion of the mobile device comprises a first mobile phone that has a first mobile phone number, the first mobile phone is able to receive said message of specified type, the first mobile phone number comprises at least a portion of said unique message address, and in response to receiving the enrollment request, and prior to sending said message of specified type to a message address that includes the first mobile phone number, at least one specified database is queried to determine whether or not the mobile device is then under the control of said user, and if not, denying the enrollment request.

17. The computer program product of claim 14, wherein:
a second mobile phone that is a separate device from said mobile device is under the control of said user at said specified time of initial registration, the second mobile phone is able to receive said message of specified type and has a second mobile phone number that comprises at least a portion of said unique message address, and in response to receiving the enrollment request, and prior to sending said message of specified type to a message address that includes the second mobile phone number, at least one specified database is queried to determine whether or not the second mobile phone is then under the control of said user, and if not, denying the enrollment request.

18. The computer program product of claim 14, wherein:

the MDM client receives the message of specified type and the pin code directly from the MDM server, and responsive to receiving the pin code, the MDM client automatically sends the pin code together with the specified credential information to the MDM server.

19. An apparatus for identifying a mobile device to a particular data processing system that has a mobile device management (MDM) server, said apparatus comprising a processor coupled to a memory comprising instructions that are operable by the processor to perform steps of:

initially registering information with the particular data processing system that pertains to a user of the mobile device, wherein the registered information includes specified credential information and further includes a unique message address associated with said user;

receiving an enrollment request message at the MDM server, wherein the enrollment request message is accompanied by said specified credential information;

responsive to receiving the enrollment request message for operating the MDM server, sending a message of specified type to the unique message address associated with said user, wherein said message of specified type includes a personal identification number (pin) code;

receiving a second message at the MDM server that includes the pin code, subsequent to sending the message of specified type; and responsive to receiving the pin code, operating the MDM server to deliver a security token for use in authenticating the mobile device to selectively access the particular data processing system.

20. The apparatus of claim 19, wherein:

the enrollment request message and the second message that includes the pin code are each sent to the MDM server by a mobile device management (MDM) client located at the mobile device.

* * * * *